(12) United States Patent
Spencer

(10) Patent No.: US 6,475,662 B1
(45) Date of Patent: Nov. 5, 2002

(54) THERMAL BATTERY

(75) Inventor: Richard D. Spencer, Webb City, MO (US)

(73) Assignee: Eagle-Picher Technologies, LLC, Joplin, MO (US)

( * ) Notice: Subject to any disclaimer, the term of this patent is extended or adjusted under 35 U.S.C. 154(b) by 172 days.

(21) Appl. No.: 09/587,444

(22) Filed: Jun. 5, 2000

(51) Int. Cl.$^7$ ............... H01M 6/36; H01M 4/36; H01M 4/48; H01M 6/20

(52) U.S. Cl. ............ 429/112; 429/102; 429/103; 429/104

(58) Field of Search ............ 429/112, 102, 429/103, 104

(56) References Cited

U.S. PATENT DOCUMENTS

| | | |
|---|---|---|
| 3,425,872 A | 2/1969 | Levy |
| 3,558,363 A | 1/1971 | Franklin |
| 3,575,714 A | 4/1971 | Bennett rt al. |
| 3,639,773 A | 2/1972 | Ayd III et al. |
| 3,677,822 A | 7/1972 | Bush |
| 3,679,487 A | 7/1972 | Coyle |
| 3,719,527 A | 3/1973 | Carlsten et al. |
| 3,750,584 A | 8/1973 | Voyentzie et al. |
| 3,764,390 A | 10/1973 | Thow |
| 4,041,217 A | 8/1977 | Collins |
| 4,044,192 A | 8/1977 | Bowser Jr. et al. |
| 4,053,690 A | 10/1977 | Backlund |
| 4,087,591 A | 5/1978 | Bowers et al. |
| 4,156,057 A | 5/1979 | Zellhoefer |
| 4,158,084 A | 6/1979 | Prentice |
| 4,332,866 A | 6/1982 | Jacquelin et al. |
| 4,432,818 A | 2/1984 | Givens |
| 4,585,713 A | 4/1986 | Pathe |
| 5,006,429 A | 4/1991 | Pracchia et al. |
| 5,382,479 A | 1/1995 | Schuster |

*Primary Examiner*—Stephen Kalafut
*Assistant Examiner*—Julian A. Mercado
(74) *Attorney, Agent, or Firm*—Wood, Herron & Evans, L.L.P.

(57) ABSTRACT

An improved thermal battery with improved operating efficiency. The thermal battery utilizes both a first activatible heat source and a second independently activatible heat source. The second heat source is optionally activated under storage environment conditions, such as low temperature, which thereby allow battery operation of improved efficiency.

9 Claims, 2 Drawing Sheets

THERMAL BATTERY

FIELD OF THE INVENTION

This invention relates to improvements in thermal batteries, and more particularly to improving the operating efficiency of the battery by the incorporation of an additional, independently activatible heat source.

BACKGROUND OF THE INVENTION

Thermal batteries are primary reserve batteries utilizing an electrolyte which is a nonconductive solid at ambient temperatures. A thermal battery is characterized by having a very long shelf life, in many instances longer than ten years, which can be activated very quickly with little degradation in performance over time. Once activated, the battery supplies electric power from a few seconds to about an hour or longer. No maintenance is required for the thermal battery during storage prior to use, permitting it to be permanently installed in equipment.

The characteristics of the thermal battery permit its use in a number of applications which extend over wide ambient temperature ranges and severe dynamic environments. It is possible for the thermal battery to reliably operate after storage at temperatures ranging from −54° C. to 71° C. A thermal battery is activated by first activating a supply of heat, such as an ignitable pyrotechnic heat source, which causes melting of the electrolyte thereby activating the one or more cells inside the battery. Because the thermal battery may be subjected to a wide temperature range during storage, it is difficult to anticipate the ambient temperature at the time of activation and therefore the quantity of heat which will be required to melt the electrolyte and activate the cells in the battery. Heat balancing of the battery has thus tended to involve a compromise. Often, the amount of included pyrotechnic heat source material that would provide good performance of the thermal battery at room temperature will yield an excessively high starting temperature in a hot-stored battery, and may lead to thermal runaway. Where the battery is stored at very low temperatures, the same amount of supplied pyrotechnic heat source material may not provide enough heat on activation to obtain an optimal operating temperature.

It has been known to utilize multiple heat sources for a thermal battery. In one configuration, the cell stack contains the primary heat source and a secondary heat source is wrapped around the thermal insulation surrounding the cell stack. The heat from the secondary source reduces the temperature gradient through the thermal insulation from the cell stack interior to the exterior environment, thereby reducing the cell stack cooling rate and extending the battery's active life. The secondary heat source is generally a zirconium/barium chromate/ceramic fiber heat paper.

In the second configuration, a resistance heating element or wire is wrapped around the thermal insulation surrounding the stack. Power to this heating element may be applied to warm a cold-stored battery before use. Alternatively, the thermal battery may be configured to supply the heating element with power during discharge of the thermal battery, thus diverting a portion of the thermal battery output for heating purposes. As before, heat from the secondary source reduces the temperature gradient, thereby reducing the cell stack cooling rate and extending the battery's active life.

SUMMARY OF THE INVENTION

It is an object of the invention to provide an improved thermal battery which provides an input of heat activation energy more closely correlated to the ambient temperature storage conditions of the battery.

It is a further object of the invention to provide an improved thermal battery having a second independently activatible pyrotechnic heat source in addition to a first pyrotechnic heat source to provide heat energy to the battery.

It is yet a further object of the invention to provide an improved thermal battery having a temperature sensor and heat source activating device which will respond to the data collected by the sensor and activate a first pyrotechnic heat source only, or both the first pyrotechnic heat source and a second pyrotechnic heat source, as required by the ambient storage temperature conditions.

The invention is premised on the realization that accounting for the ambient storage temperature of the battery measured at or adjacent the battery core can allow for improved control of thermal battery activation. This control is effected by utilizing a second, independently activatable pyrotechnic heat source in addition to a first pyrotechnic heat source to provide sufficient energy to melt the electrolyte and thereby activate the individual cells of the battery. At least the second pyrotechnic heat source is controlled via a sensor and activating device. The sensor will evaluate the ambient temperature of the battery at or near the core and optionally also outside the battery casing, and determine if the second heat source must be activated in addition to the first heat source to achieve an optimum operating temperature for the cell stack inside the battery casing. The second pyrotechnic heat source may have a different composition with a higher activation temperature than the first heat source, so that it is not activated by the heat generated from the first pyrotechnic heat source or its activating device. Alternatively, if sufficient insulation is provided between the first and second pyrotechnic sources to prevent activation of both when only one is to be activated, each heat source can be produced from the same ignitable material. This latter combination of pyrotechnic sources is advantageously used where one source is positioned inside the battery casing, and the other around the outside perimeter of the casing. Preferably, both the first and second pyrotechnic heat sources are located inside the battery case in close proximity to the electrolyte to more efficiently transfer heat.

A battery having independently ignitable first and second pyrotechnic heat sources wherein at least the second heat source is controlled by a sensor and activating device will be able to at least partially compensate for the ambient temperature of the battery at the time of activation, decreasing both the risk of thermal runaway at excessively high ambient temperature and inefficient operation at low ambient temperature.

Another advantage of a battery with independently ignitable heat sources is the option to activate the electrolyte with one pyrotechnic heat source and allow the cells to partially discharge before the electrolyte cools, and then at a later time reactivate the electrolyte with the second heat source. This application-specific arrangement could allow for reactivation as necessary.

Various other objects and advantages will appear from the following description of the invention and the drawings, in which

DETAILED DESCRIPTION OF THE INVENTION

Figure 1:
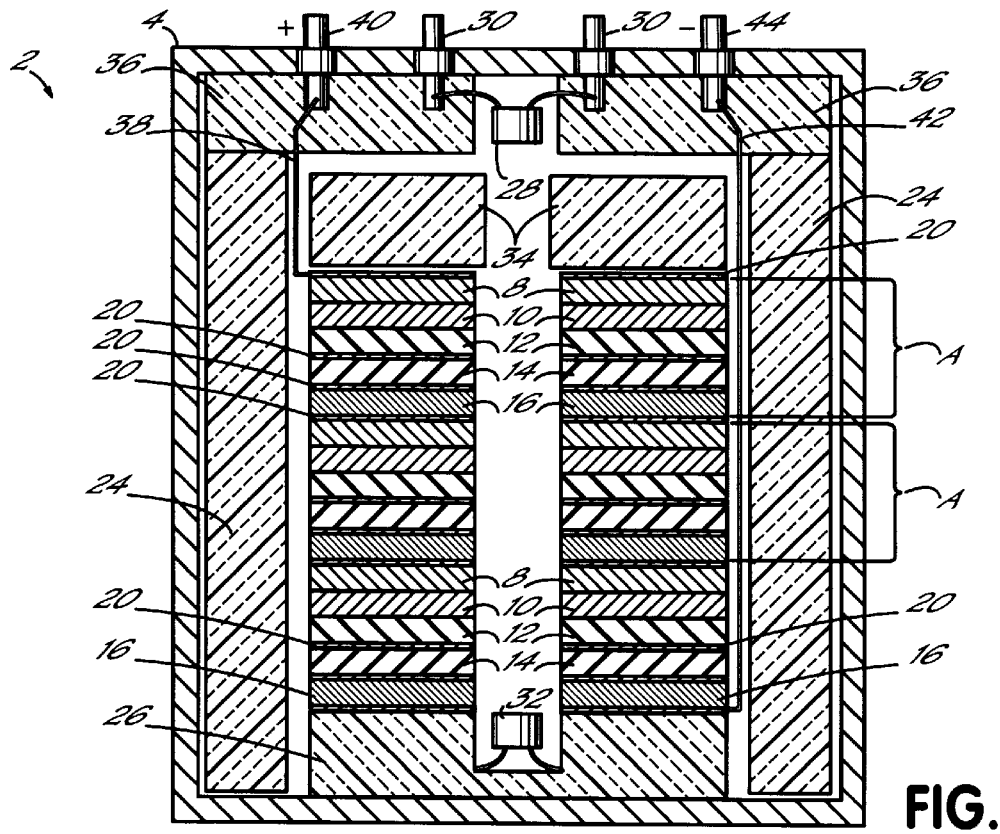
FIG. 1 is a plan cutaway view of a battery housing multiple cells with one configuration of the ignitable heat sources.

The invention in its broader aspects is directed to a thermal battery comprising at least one cell including a cathode, anode, and heat-activatible electrolyte; a first pyrotechnic heat source, and a second independently activatible pyrotechnic heat source. Preferably, the at least one cell and first and second pyrotechnic heat sources are enclosed within a battery case. The enclosure of the heat sources in the battery case improves the heat transfer efficiency from the first and second pyrotechnic heat sources to the heat activatible electrolyte. Where the thermal battery is comprised of multiple cells of cathode, anode and heat-activatible electrolyte, the number of first and second pyrotechnic heat sources individually may differ from the number of cells.

The second pyrotechnic heat source may be of the same type and sensitivity as the first pyrotechnic heat source, or may be a different type and sensitivity. In the first instance, the thermal battery must include sufficient thermal insulation between the first and second pyrotechnic heat sources so that the squib or similar activating device for the first pyrotechnic heat source does not simultaneously activate the second pyrotechnic heat source. One method by which the necessary insulation environment can be created is by the placement of one pyrotechnic heat source outside the battery casing, and the other inside.

Preferably, the second pyrotechnic heat source is a different type and sensitivity than the first. Activation of the first pyrotechnic heat source by a squib designed for that particular heat source material is insufficient to activate the second pyrotechnic heat source. The second pyrotechnic heat source has a separate squib or similar device which supplies the energy necessary to activate the second pyrotechnic heat source independent of the first. As can be appreciated, activating the second pyrotechnic heat source at a higher temperature will simultaneously activate the first pyrotechnic heat source operating at a lower activation temperature where the two heat sources are not insulated from each other.

The first pyrotechnic heat source may be prepared from a mixture of iron powder and potassium perchlorate typically pressed into a tablet or pellet and commonly known as a heat pellet. Heat pellets are manufactured by cold pressing a dry blend of fine iron powder and potassium perchlorate. The iron powder particle size is generally in the range of 1 to 10 microns. Iron content is set in excess of stoichiometry to ensure electrical conductivity after activation, and ranges from 80% to 88% by weight. The heat content of heat pellets typically ranges from $920^{Joules}/_{gram}$ for 88% iron pellets to $1590^{Joules}/_{gram}$ for 80% iron pellets. Where the second pyrotechnic heat source has a higher activation temperature, it may be prepared from mixtures that are more difficult to ignite, such as titanium plus boron or titanium plus boron carbide, the latter described in U.S. Pat. No. 4,432,818, incorporated herein by reference.

The thermal battery of this invention can be used in any of the environments where prior art thermal batteries had been employed. Prior art thermal batteries were activated in response to a control signal, for example from a remote radio source, in response to a sensor monitoring environmental conditions such as a seismic tremor, or in response to a firing signal for use in a military application. The thermal battery of the invention further comprises a control device which monitors the battery core temperature conditions and optionally the ambient temperature conditions in the vicinity of the stored thermal battery. Where the battery core temperature is within a first temperature range, generally at the higher end of the working range of the thermal battery of between about −54° C. to 71° C. the control device allows for activation of the first pyrotechnic heat source only. Where the battery core temperature range is at a lower, second range, the control device selectively activates both the first and second pyrotechnic heat sources. Thermal runaway is not a significant concern with the battery core in this second temperature range, and activation of both first and second pyrotechnic heat sources facilitates the melting of the electrolyte in a manner which provides more efficient operation of the thermal battery.

In FIG. 1, the thermal battery 2 is comprised of a battery case 4 which encloses separately ignitable first and second pyrotechnic heat sources employed as elements within the battery 2. The battery case can be formed in a variety of shapes, but typically is a cylinder. Shown in the thermal battery 2 are the cathodes 8 adjacent electrolyte composite 10, in turn adjacent to anodes 12. Where the battery case 4 is a cylinder, the elements typically are circular disks having a centered hole.

First pyrotechnic heat source 14 and second pyrotechnic heat source 16 are arranged adjacent the cell comprised of cathode 8, electrolyte composite 10 and anode 12, and are separated from each other and from the other stack components by metallic electrodes 20. The repeating unit "A" in FIG. 1 includes cathode 8, electrolyte composite 10, anode 12, first pyrotechnic heat source 14 and second pyrotechnic heat source 16, with interspersed metallic electrodes 20 as needed. The metallic electrodes are typically prepared from sheets of cold-rolled iron, stainless steel preferably of the 300 series, or molybdenum. The metallic electrodes 20 are positioned in the cell stack between a heat source and the anode, and optionally also between a heat source and the cathode. The anode generally is sensitive to heat, and the metallic electrode 20 operates to insulate the anode. Also, the metallic electrode 20 moderates the heat generated by the heat source. The placement of a metallic electrode between a heat source and the cathode is optional, and is determined by the application for which the battery will be used.

The thermal battery 2 further includes sidewall insulation 24, which is made of fibrous ceramic material similar in appearance and insulation properties to asbestos formed into a non-woven mat. Representative materials include $Al_2O_3/SiO_2$ blends such as FIBERFRAX® made by Carborundum and LYTHERM® by Lydall. The thermal battery also includes a lower end assembly 26, the primary squib 28 connected to activation pins 30, secondary squib 32, upper end assembly 34, insulation 36, cathode collector 38 in electrical contact with cathodes 8 and positive pin 40, and anode collector 42 in electrical contact with anodes 12 and negative pin 44.

The cathode 8 can be produced from a variety of materials, such as calcium chromate ($CaCrO_4$), potassium dichromate ($K_2Cr_2O_4$), potassium chromate ($KCr_2O_2$), lead chromate ($PbCrO_4$), metal oxides such as vanadium pentoxide ($V_2O_5$) and tungsten trioxide ($WO_3$), and sulfides such as cupric sulfide (CuS), iron disulfide ($FeS_2$), and cobalt disulfide ($COS_2$). A preferred material is iron disulfide powder mixed with minor portions of the electrolyte salt mixture and optionally binder material such as magnesium oxide. Iron disulfide and cobalt disulfide are preferred for use with lithium-containing anodes because of chemical compatibility.

The anodes may be made of calcium metal or magnesium metal, but lithium metal and lithium-aluminum or lithium-silicon alloys are preferred. The lithium-aluminum and lithium-silicon alloys are processed into powders and cold-pressed into wafers or pellets. In the cell the anode material is backed with an electrode, which may be iron, stainless steel, or the like. The lithium alloy anode materials function in the activated cell as solids, and thus the operating temperature must be below the melting point of the alloy. Where lithium metal is used as the anode material, its low melting point at 181° C. requires the use of a high surface area metal powder (such as iron or nickel) or metal foam which holds the molten lithium in place by surface tension.

The electrolyte composite 10 may be made from a number of salt combinations. One composition is a eutectic mixture of 45% by weight lithium chloride (LiCl) and 55% by weight potassium chloride (KCl) having a melting point of 352° C. mixed with a very high surface area binder material such as magnesium oxide (MgO) or aluminum oxide ($Al_2O_3$) to maintain a viscosity sufficient to limit flow of the salt mixture after it melts. Other salt combinations include lithium bromide—potassium bromide—lithium fluoride (m.p. 313° C.), lithium chloride—lithium bromide—potassium bromide (m.p. 321° C.), and lithium chloride—lithium bromide—lithium fluoride (m.p. 430° C.).

The sidewall insulation 24 is typically prepared from ceramic fibers arranged in a flexible or rigid mat. Upper end assembly 34 and lower end assembly 26 are also made from ceramic fibers. These two assemblies are typically rendered more rigid than the sidewall insulation 24 to support the cell stack. Upper end assembly 34 and lower end assembly 26 may incorporate iron powder-potassium perchlorate heat pellets which activate and supply heat to the ends of the cell stack to assist in maintaining a uniform temperature along the cell stack.

The primary squib 28 for activating the first pyrotechnic heat source 14 is an electro-explosive device having a preferred output mixture of zirconium and iron oxide. The secondary squib 32 typically is also an electro-explosive device having a preferred output mixture of zirconium and iron oxide. This mixture can be used to ignite the titanium-boron pellets.

Figure 2:
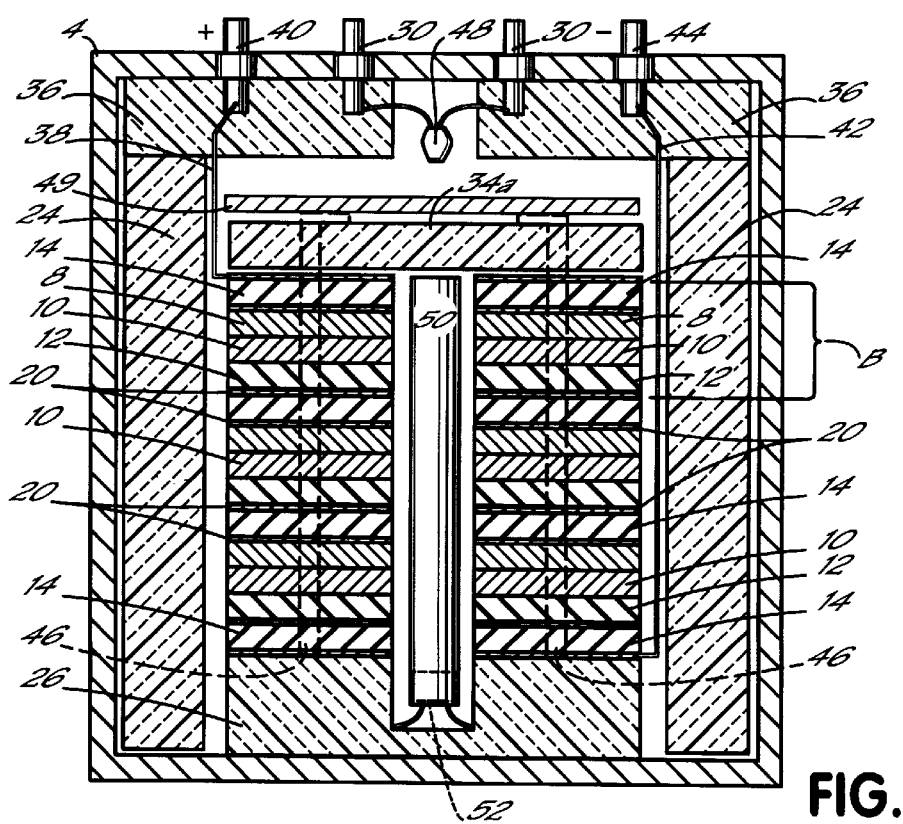
FIG. 2 is a plan cutaway view of a battery housing multiple cells with an alternate configuration of the ignitable heat sources.
Figure 2A:
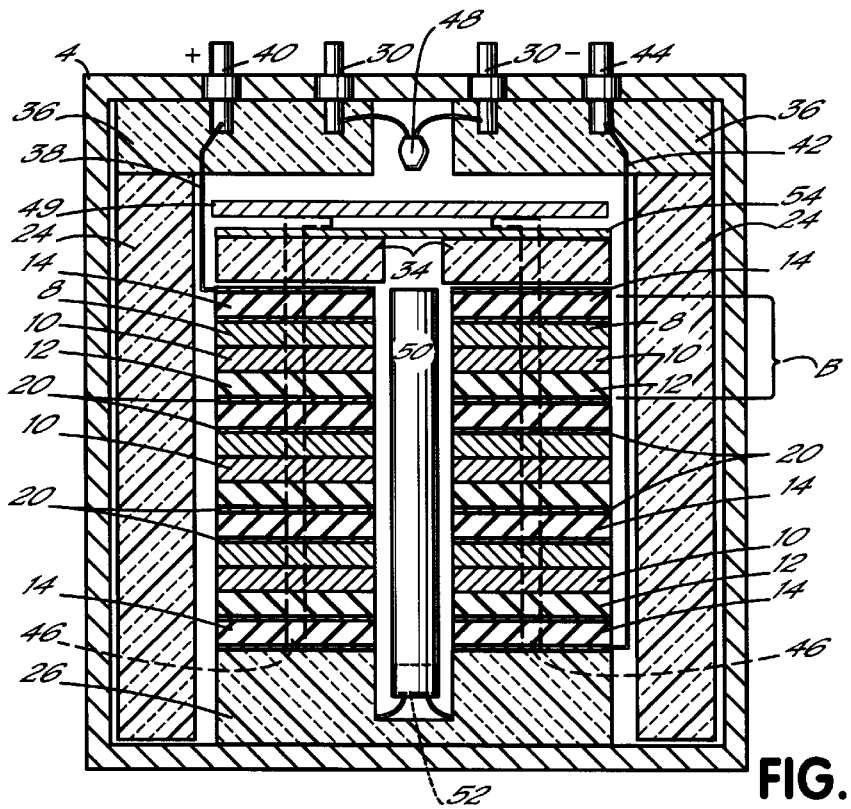
FIG. 2a is a plan cutaway view of a battery housing multiple cells as shown in FIG. 2 with an alternate support configuration for the heat paper fuse pad.

In the alternate thermal battery configuration in FIG. 2, the components of the battery are substantially the same but with the following modifications. The first pyrotechnic heat sources 14 are located at opposite ends of the cell stack as well as being distributed throughout the cell stack. The repeating unit "B" in FIG. 2 (and FIG. 2a below) includes first pyrotechnic heat source 14, cathode 8, electrolyte composite 10 and anode 12, with interspersed metallic electrodes 20 as needed. The first pyrotechnic heat sources 14 are ignited by the heat paper fuse train 46, prepared typically from a mixture of pyrotechnic grade zirconium powder and barium chromate supported in an organic fiber mat interspersed with inorganic fibers such as ceramic and glass fibers. The heat paper fuse train 46 in, turn is easily ignitable by practically any first fire, including that from a low power electric match 48 which is ignited by passing current through activation pins 30. The heat paper fuse train 46 is generally comprised of multiple strips which drape at multiple locations over the circumference of the cell stack.

The multiple strips in turn are in thermal contact with a heat paper fuse pad 49 made of the same material and located at the top of the cell stack above the upper end assembly. In FIG. 2, the heat paper fuse pad 49 rests on the top of an upper end assembly 34a which is solid across its face to isolate the second pyrotechnic heat source 50 from the electric match 48. In the alternative embodiment, shown in FIG. 2a, a metallic barrier disk 54 is positioned above the upper end assembly 34 where the upper end assembly 34 contains a center hole. The heat paper fuse pad 49 rests on the metallic barrier disk 54 in thermal contact with the heat paper fuse trails 46. Igniting the electric match 48 causes ignition of the heat paper fuse pad 49 and thereby the heat paper fuse train 46.

The second pyrotechnic heat source 50, in cylindrical form, is attached to a secondary squib 52. Heat supplied by the second pyrotechnic heat source 50 in FIG. 2 is received by the electrolyte composite 10 beginning at the inner radius of the electrolyte composite and traveling radially outward toward the battery case 4. This alternative configuration may realize space savings by the ability to eliminate the second pyrotechnic heat source as discrete layers within the cell stack, but the heat transfer to the electrolyte composite 10 by use of a centered pyrotechnic heat source 50 is less efficient.

Figure 3:
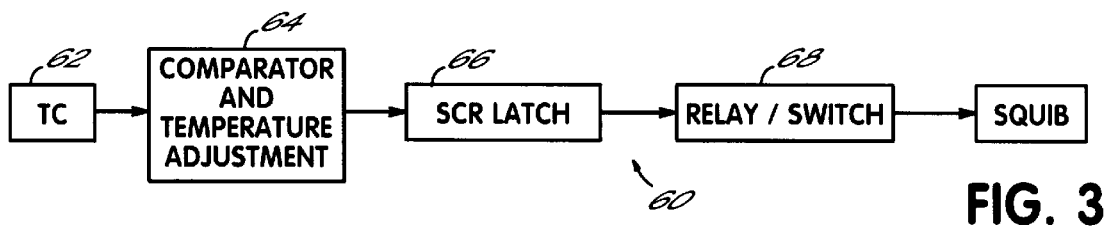
FIG. 3 is a schematic view depicting the elements of a temperature sensor and activating device.

FIG. 3 depicts schematically a control circuit 60 for use in connection with activating both first and second pyrotechnic heat sources, or second pyrotechnic heat source alone. The control circuit 60 is comprised of a thermocouple 62, which in turn is connected to a temperature adjustment circuit 64, and thereafter to the silicon-controlled resistor (SCR) latch 66, in turn connected to the relay or switch 68, which controls the firing of the squib. It can be appreciated that the thermocouple 62 may be functionally replaced by a thermistor. The thermocouple 62 is preferably positioned near the battery core. optionally, at least one additional thermocouple is positioned in the vicinity of the battery 2 to measure the ambient storage temperature. Other ways to control squib firing in response to temperature are possible.

The thermal battery 2 is activated by an input signal which in one embodiment provides an input to the control circuit 60. Upon receipt of this signal, the control circuit 60 evaluates the ambient temperature of the stored thermal battery 2 and compares this temperature with a predetermined minimum temperature. This minimum temperature is set based on one or more of a number of parameters, including heat output of the first pyrotechnic heat source, size of the thermal battery, use application for the thermal battery, and the like. The control circuit 60 determines whether only the first pyrotechnic heat source will be activated, or if both first and second heat sources will be activated. Upon the determination based on whether the ambient temperature is below the predetermined minimum temperature. The relay or switch 68 is configured in a manner sufficient to activate either first pyrotechnic heat source 14 alone, or both first and second pyrotechnic heat sources 14 and 16. Alternatively, the input signal activates the first pyrotechnic heat source directly, with the control circuit 60 also receiving the signal and controlling the activation of only the second pyrotechnic heat source 16.

The thermal batteries of this invention are thus capable of being utilized in the existing applications for this type of battery, but with operation more closely attuned to the ambient temperature conditions of the stored thermal battery. As a result, the activated thermal battery will be less susceptible to thermal runaway when stored hot, and will have more reliable operation at low temperatures. It can be appreciated that the quantity of the first pyrotechnic heat source and second pyrotechnic heat source material can be adjusted to compensate for the anticipated storage condition temperature range, the size of the battery, and the size and number of individual cells within the battery.

Thus is it apparent that there has been provided, in accordance with the invention, an improved thermal battery which fully satisfies the objects, aims, and: advantages set forth above. While the invention has been described in conjunction with specific embodiments thereof, it is evident that many alternatives, modifications, and variations will be apparent to those skilled in the art in light of the foregoing description. Accordingly, departures may be made from such details without departing from the spirit or scope of the general inventive concept.

What is claimed is:

1. A thermal battery comprising:
   at least one cell including a cathode, a node, and heat activatible electrolyte;
   a first pyrotechnic heat source;
   a second independently activatible pyrotechnic heat source; and
   a control device which monitors thermal battery storage temperature and activates said first pyrotechnic heat source when said storage temperature is within a first range, and activates both said first and second pyrotechnic heat sources when said storage temperature is within a second range.

2. The thermal battery of claim 1 further comprising a battery case to enclose said at least one cell, said first pyrotechnic heat source, and said second pyrotechnic heat source.

3. The thermal battery of claim 1 wherein said second pyrotechnic heat source is the same type and sensitivity as said first pyrotechnic heat source.

4. The thermal battery of claim 1 wherein said first pyrotechnic heat source is a mixture of iron powder and potassium perchlorate.

5. The thermal battery of claim 1 wherein said second pyrotechnic heat source is a mixture of titanium and boron.

6. A thermal battery comprising:
   at least one cell including a cathode, anode, and heat-activatible electrolyte;
   a first pyrotechnic heat source; and
   a second independently activatible pyrotechnic heat source, wherein said second pyrotechnic heat source is a different type and sensitivity than said first pyrotechnic heat source.

7. A method of supplying heat to a thermal battery to activate the electrolyte in the thermal battery, comprising:
   activating a first pyrotechnic heat source in thermal contact with said thermal battery in response to a signal for initiating operation of said thermal battery;
   measuring a temperature of a storage environment of said thermal battery;
   comparing said temperature to a predetermined minimum temperature; and
   activating a second pyrotechnic heat source in thermal contact with said thermal battery when said temperature is less than said predetermined minimum temperature.

8. The method of claim 7 wherein said temperature is measured in a core of said thermal battery.

9. The method of claim 7 wherein said temperature is measured adjacent to a core of said thermal battery.

* * * * *